J. T. CLARKE.
FOCUSING DEVICE.
APPLICATION FILED OCT. 8, 1912.
1,089,111.
Patented Mar. 3, 1914.
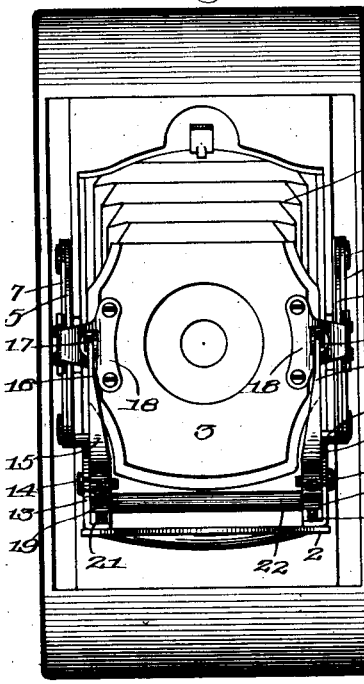
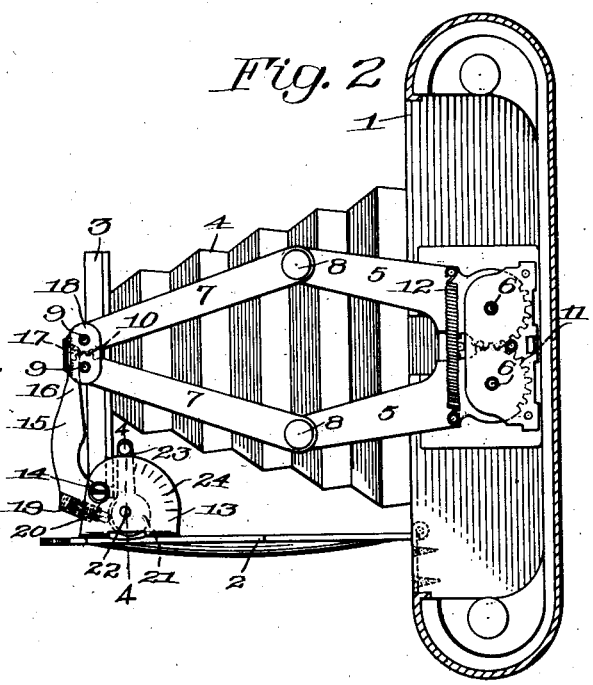
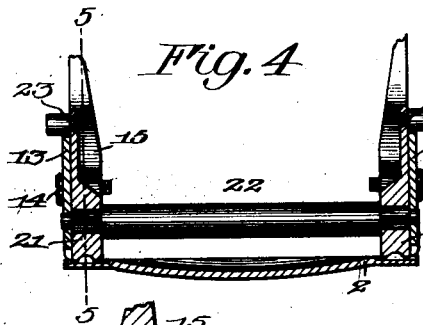
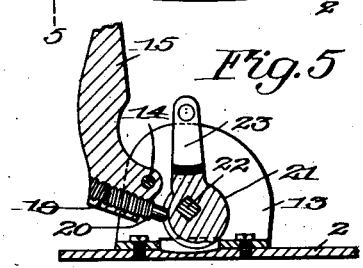
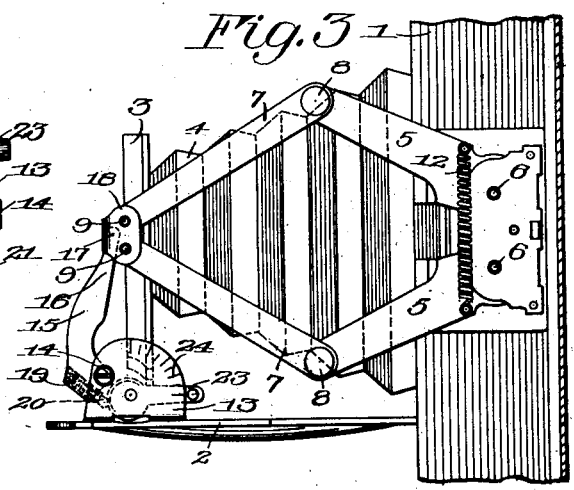
Inventor
Joseph Thacher Clarke

UNITED STATES PATENT OFFICE.

JOSEPH THACHER CLARKE, OF HARROW, ENGLAND, ASSIGNOR TO EASTMAN KODAK COMPANY, OF ROCHESTER, NEW YORK, A CORPORATION OF NEW YORK.

FOCUSING DEVICE.

1,089,111.   Specification of Letters Patent.   Patented Mar. 3, 1914.

Application filed October 8, 1912. Serial No. 724,593.

*To all whom it may concern:*

Be it known that I, JOSEPH THACHER CLARKE, of Harrow, England, have invented certain new and useful Improvements in Focusing Devices; and I do hereby declare the following to be a full, clear, and exact description of the same, reference being had to the accompanying drawings, forming a part of this specification, and to the reference-numerals marked thereon.

My present invention relates to photography more particularly to photographic cameras, and it has for its object to provide a folding camera of the quick focusing type which will also provide means of a simple and convenient nature whereby the focus may be altered within certain limits. In other words, the invention contemplates a camera in which the front is automatically or quickly projected to a predetermined extent that will produce the approximate focal length and may thereafter be subject to a finer adjustment along the focal axis.

To these and other ends the invention consists in certain improvements and combinations of parts all as will be hereinafter more fully described, the novel features being pointed out in the claims at the end of the specification.

In the drawings: Figure 1 is a front elevation of a folding camera in extended position which camera is constructed in accordance with and illustrates one embodiment of my invention; Fig. 2 is a side elevation thereof; Fig. 3 is a fragmentary view corresponding to Fig. 2 but showing the positions of the parts after an adjustment has been made by means of the focusing devices; Fig. 4 is an enlarged sectional view through the focusing devices taken substantially on the line 4—4 of Fig. 2, and Fig. 5 is a transverse sectional view taken substantially on the line 5—5 of Fig. 4.

Similar reference numerals in the several figures indicate the same parts.

The camera, as to its general features may be of usual construction comprising a body 1, a cover 2 which, when in the extended position shown in the figures constitutes a bed or bellows support, and a front 3 connected to the body by collapsible bellows 4. I prefer to support the front when extended by means of a pair of inner links 5 pivoted to the body at 6, and a pair of outer links 7 pivoted to the inner links at 8 and to the front at 9. The respective pairs of links have intermeshing teeth 10 and 11 so that the front 3 is given a parallel motion toward and from the body as it is projected and retracted and folds to a position within the latter wherein it is retained beneath the cover 2.

A spring or motor device 12 connects the links 5 under the influence of which the extension supports have a tendency to normally project the front to an extreme outward position and when the cover 2 is released and the camera unfolded they so exert themselves, thus automatically bringing the front to at least an approximate position of focus. At this point, however, a finer adjustment may be obtained and the focus changed within certain limits by the operation of the following devices:

On each side of the bed at the forward point I arrange a vertically disposed bracket plate 13 on which is pivoted at 14 a link 15. This link constitutes a lever, one arm 16 of which is pivoted at 17 to the front 3 or, rather, directly to a bracket 18 thereon that also carries the pivots 9 of the link supports 7. The other arm 19 of the link or lever is provided with a set screw or contact piece 20 that coöperates with the face of an oscillatory cam 21 fixed to a shaft 22 journaled in and extending between the bracket plates 13. An extension 23 on each cam adjacent to the bracket plate forms a handle or operating member for turning the shaft and cams. When so rotated, the links or levers 15 are moved and the front 3 is moved toward or from the camera body on the line of the focal axis according to whether the contact point 20 engages a high or a low portion of the cam. Of course, the front is not actually moved outward in the present embodiment by the lever 15 for the latter rather permits this movement, the actuation being accomplished by the spring 12 which is constantly urging the support 5—7 to extended position and hence the front 3 to an extreme outward position and the front, therefore, holds the contact member 20 on the lever in engagement with the cam 21 but when a higher point of the cam coöperates with the contact member, the front is forced inwardly against the tension of the spring 12 in a positive manner.

Graduations 24, preferably on the bracket plates 13 may be used to indicate the adjustment of the focusing devices with reference to the position of the operating handle 23, and for this purpose these graduations may be in terms of focal distance.

The link connection 15 does not interfere with the folding of the camera or with the parallel movement of the front and body during this operation as the bed or cover 2 follows the front in its movement toward the body and indeed is drawn inward thereby and the link 15 simply folds to a vertical position with the pivot 14 above the pivot 17 instead of the reverse as will be readily understood. When in the extended position, the link 15 forms an additional support for the front on the bed 2 so that the front is not entirely dependent upon the rigidity of its extension supports to give it fixed position.

The purpose of providing the adjustable contact 20 between the link 15, or rather its arm 19, and the cam 21 is to allow of a preliminary adjustment when the camera is set up in the first instance and to compensate for any slight irregularity in the assembling of the parts which would otherwise bring the minimum adjustment into inaccuracy and the other readings of the scale as well and in the same degree. The member 20 may be in the form of a set screw or threaded plug as shown having a rounded point and having a locking screw 25 driven in upon it.

I claim as my invention:

1. In a camera, the combination with a body, a front and extension supports for the latter causing parallel movement of the parts as the front is projected and retracted, of means tending to actuate the front to one of said positions and a focusing device embodying a member directly connected to the front independently of the extension supports for operating the latter in the opposite direction against the influence of the actuating means.

2. In a camera, the combination with a body, a front and extension supports for the latter permitting the front to be projected and retracted, of means tending to actuate the front to one of said positions, a bed adapted to be extended below the front and a focusing device on the bed operatively connected to the front to move it against the influence of the actuating means.

3. In a camera, the combination with a body, a front and extension supports for the latter causing parallel movement of the parts as the front is projected and retracted, of means tending to actuate the front to one of said positions, a bed adapted to be extended below the front, a lever pivoted on the bed and having one arm coöperating with the front and means on the bed acting against the other arm of the lever to move the front against the influence of the actuating means.

4. In a camera, the combination with a body, a front, extension supports for the latter causing parallel movement of the parts as the front is projected and retracted, a bed adapted to close the body when the front is retracted to a position therein and to lie extended below the front when the latter is projected, means tending to actuate the front to projected position, a link pivotally connecting the front and bed and means on the bed arranged to act against the link whereby the front is operated against the influence of the actuating means.

5. In a camera, the combination with a body, a front adapted to fold within the latter, extension supports for the front, and a bed and cover hinged to the body, of a link pivoted to the bed and to the front and means on the bed for rocking the link to move the front relatively to the body.

6. In a camera, the combination with a body, a bed and cover hinged to the body, a front and extension supports for the latter causing it to fold beneath the cover and to be projected above the cover when the latter is extended to form a bed, of a link pivoted to the front and to the bed, a cam on the bed coöperating with the link to rock the same and move the front along the focal axis, and an operating member for the cam.

7. In a camera, the combination with a bed and a front movable relatively thereto, of means for moving the front along the focal axis comprising a lever pivoted to the bed and coöperating with the front, an oscillatory cam on the bed engaging one arm of the lever and an operating handle for the lever.

8. In a camera, the combination with a bed and a front movable relatively thereto, of means for moving the front along the focal axis comprising a pair of vertical bracket plates, a shaft journaled therein, a cam on the shaft adjacent to each bracket plate, a lever pivoted to each bracket plate having one arm coöperating with the front, and the other with the adjacent cam and an operating handle at each end of the shaft for oscillating the latter and the cams.

9. In a camera, the combination with a bed, and a front movable relatively thereto, of means for moving the front along the focal axis comprising a lever pivoted to the bed and coöperating with the front, a cam on the bed engaging one arm of the lever, means for operating the cam and an adjustable contact member between the cam and said arm for controlling the throw of the lever.

10. In a camera, the combination with a body, a front, and extension supports for the latter causing parallel movement of the parts as the front is projected and retracted, of means tending to actuate the front to projected position, a bed adapted to be extended below the front, a pivoted supporting link connecting the front and bed and means acting on the supporting link to move the front along the focal axis against the actuating means.

11. In a camera, the combination with a body, a front, extension supports for the latter causing parallel movement of the parts as the front is projected and retracted, of a bed adapted to close the body when the front is retracted to a position therein and to lie in a position below the front when the latter is projected and a link connecting the front and bed whereby the latter follows the former to folded position.

JOSEPH THACHER CLARKE.

Witnesses:
F. F. CHURCH,
RUSSELL B. GRIFFITH.